United States Patent [19]

King et al.

[11] Patent Number: 5,525,999
[45] Date of Patent: Jun. 11, 1996

[54] MULTI-RECEIVER MASTER CONTROL STATION FOR DIFFERENTIAL GPS AND METHOD

[75] Inventors: Thomas M. King; Stephen J. Sheard, both of Tempe, Ariz.

[73] Assignee: Motorola, Inc., Schaumburg, Ill.

[21] Appl. No.: 345,970

[22] Filed: Nov. 28, 1994

[51] Int. Cl.⁶ .............................. H04B 7/185; G01S 5/02
[52] U.S. Cl. ............................................ 342/357; 455/12.1
[58] Field of Search ............................ 342/357; 455/12.1

[56] References Cited

U.S. PATENT DOCUMENTS

| | | | |
|---|---|---|---|
| 4,578,678 | 3/1986 | Hurd | 343/357 |
| 4,751,512 | 6/1988 | Longaker | 342/357 |
| 4,809,005 | 2/1989 | Counselman, III | 342/352 |
| 4,903,212 | 2/1990 | Yokouchi et al. | 364/449 |
| 4,983,980 | 1/1991 | Ando | 342/357 |
| 5,101,356 | 3/1992 | Timothy et al. | 364/449 |
| 5,119,103 | 6/1992 | Evans et al. | 342/423 |
| 5,194,871 | 3/1993 | Counselman, III | 342/357 |
| 5,252,982 | 10/1993 | Frei | 342/357 |

*Primary Examiner*—Theodore M. Blum
*Attorney, Agent, or Firm*—Jeffrey D. Nehr

[57] ABSTRACT

A master control station (10) includes a common antenna (12) which drives two, unsynchronized multi-channel GPS receivers (16, 18). The two receivers (16, 18) couple to a controller (24). The controller (24) commands the receivers (16, 18) to identify all GPS satellites in view, and then assigns (48) satellites to various channels in the receivers (16, 18). The assignment includes at least one common satellite between the two receivers. Location data are obtained from the two receivers for the common satellite and used to normalize (66) all pseudorange data from all channels to compensate for the lack of synchronization between the two receivers (16, 18). Differential GPS location resolution (84) may then occur using the normalized data.

19 Claims, 4 Drawing Sheets

| IN-VIEW TABLE ||||| 
|---|---|---|---|---|
| TIME STAMP | RECEIVER ID | SVID | EPHEMERIS | ELEVATION ANGLE |
|  |  |  |  |  |

| PSEUDORANGE DATA TABLE ||||||
|---|---|---|---|---|---|
| TIME STAMP | RECEIVER ID | SVID | PR | PRR | EPHEMERIS |
|  |  |  |  |  |  |

MULTI-RECEIVER MASTER CONTROL STATION FOR DIFFERENTIAL GPS AND METHOD

TECHNICAL FIELD OF THE INVENTION

The present invention relates generally to location positioning systems. More specifically, the present invention relates to master control stations usable with the Global Positioning System (GPS) to perform differential GPS location resolution processes.

BACKGROUND OF THE INVENTION

The Global Positioning System (GPS) includes 24 satellites orbiting the earth at around 20,000 km. The 24 satellites are distributed so that four satellites reside in each of six orbital planes which roughly form north-south orbits at around 55 degrees inclination from the equator. Each satellite traverses its orbit in approximately 12 sidereal hours. The satellites use spread spectrum techniques to repetitively transmit their versions of the current time, their current ephemeris data, and their identification numbers (SVIDs).

Roving GPS receivers receive these transmissions near the earth's surface and resolve their locations based upon the data conveyed in the satellite transmissions and upon characteristics of the received signals. The resolution of a roving receiver's location requires a pseudorange measurement and a pseudorange rate measurement to be determined. The pseudorange measurement corresponds to a propagation delay of a transmitted signal traveling between the satellite and the roving receiver, and the pseudorange rate measurement corresponds to the signal's Doppler. As implied by the "pseudo" prefix, these measurements may not be accurate because they are determined using the roving receiver's internal time base which is not synchronized with the satellite'stime base. Nevertheless, commercially available roving GPS receivers can autonomously determine their accuracy to within 100 meters or less.

However, many location applications require greater accuracy than that autonomously determined by commercial GPS receivers. Such applications include geographic information databases, emergency location services, and others. Greater accuracy can be achieved using a technique known as differential GPS. Generally, differential GPS uses a stationary master control station positioned at a known location to monitor GPS satellite transmissions. The master control station uses its known location to perform the inverse of the location resolution process to determine what pseudorange and pseudorange rate measurements should have been detected at the master control station to yield the correct location. The master control station generates measurement corrections once the appropriate measurements are determined. Positioning accuracies of less than five meters and even less than one meter in certain situations can be obtained when the autonomously determined pseudorange and pseudorange rate measurements for a roving receiver within a few hundred kilometers of the master control station are corrected by the differential GPS data.

Conventional master control stations tend to be complex, inflexible, and expensive pieces of equipment. Their complexity is due, at least in part, to the inclusion of more channels than are included in conventional roving GPS receivers. More channels are required so that differential GPS correction data may be provided at all times for the maximum number of satellites which can be in view of the master control station. Conventional master control stations tend to be inflexible and expensive because only a few are required to support an entire population of roving GPS receivers. Consequently, master control stations have not achieved the pricing, flexibility of use, and reliability advantages which have been achieved by mass market roving GPS receivers.

SUMMARY OF THE INVENTION

Accordingly, it is an advantage of the present invention that an improved master control station for use in connection with differential GPS location determination is provided.

Another advantage is that the present invention provides a low cost method for accurately determining locations.

Another advantage is that the present invention provides a master control station that utilizes at least two GPS receivers intended as roving receivers.

Another advantage is that the present invention normalizes time base offsets between two GPS receivers to provide a master control station that monitors more channels than are monitored by either GPS receiver alone.

The above and other advantages of the present invention are carried out in one form by a differential global positioning system (GPS) location determination method. The method calls for generating pseudorange measurements for each of N channels, where N is an integer number greater than one, in a first GPS receiver which operates upon a first time base. Pseudorange measurements for each of M channels, where M is an integer number greater than one, are generated in a second GPS receiver which operates upon a second time base. A common one of the N first receiver channels and the M second receiver channels is identified. A difference between the first and second time bases is determined in response to pseudorange C measurements generated by the first and second receivers for the common satellite.

BRIEF DESCRIPTION OF THE DRAWINGS

A more complete understanding of the present invention may be derived by referring to the detailed description and claims when considered in connection with the FIG., wherein like reference numbers refer to similar items throughout the FIG., and:

FIG. 6 shows a flow chart of a correction process performed by the master control station.

DETAILED DESCRIPTION OF THE PREFERRED EMBODIMENTS

Figure 1:
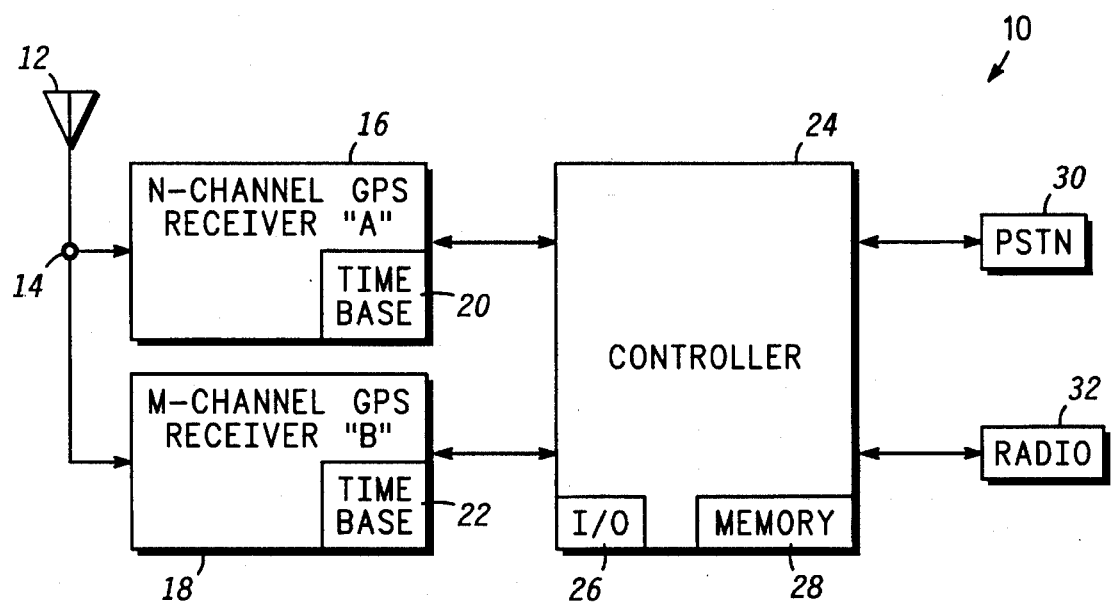
FIG. 1 shows a block diagram of a differential GPS master control station.

FIG. 1 shows a block diagram of a differential Global Positioning System (GPS) master control station 10. Station 10 includes a single antenna 12 configured to receive conventional GPS L-band signals. Antenna 12 couples to a first port of a signal splitter 14, a second port of splitter 14 couples to an RF input of a GPS receiver 16, and a third port of splitter 14 couples to an RF input of a GPS receiver 18. The use of a common antenna to drive two receivers results in a 3 dB signal loss to each receiver. However, GPS receivers are routinely designed with sufficient link margin so that this minor loss poses no problem, and antenna 12 is desirably positioned in a stationary, known location, such as on an antenna tower, where it can continuously receive strong signals.

Receiver 16, which is also referred to as receiver "A", and receiver 18, which is also referred to as receiver "B", are conventional GPS receivers. GPS receivers 16 and 18 each have several channels so that they can simultaneously track several different GPS satellites. A GPS receiver needs to track at least three GPS satellites to resolve a location within two dimensions and at least four GPS satellites to resolve a location within three dimensions. However, the more pseudorange data that can be collected, the more accurate the location resolution. Thus, GPS receivers often have five or more channels.

The more channels that receivers 16 and 18 have the better, and receivers 16 and 18 preferably have between them more than enough channels to track all GPS satellites which may be in view above the horizon where station 10 is located. This number is usually around 10–12 satellites, depending upon location. FIG. 1 depicts receiver 16 as being an N channel GPS receiver and receiver 18 as being an M channel GPS receiver, where N and M are integer numbers greater than one. The number M may equal the number N for convenience, but this is not required. In the preferred embodiment, station 10 uses two VP Oncore GPS receivers manufactured by Motorola, Inc. for receivers 16 and 18. The VP Oncore GPS receiver has six channels.

For autonomous location determination, measurements for all channels supported by a single GPS receiver are based upon the same time base, so time synchronization exists between different channels of a single receiver. In system 10, receiver 16 has an internal time base 20, and receiver 18 has an internal time base 22. Nothing requires time base 20 to be synchronized to time base 22. Receiver 16 makes pseudorange and pseudorange rate measurements based upon time base 20, and receiver 18 makes pseudorange and pseudorange rate measurements based upon time base 22. Due to the lack of synchronization between time bases 20 and 22, receivers 16 and 18 tend to generate different pseudorange and pseudorange rate measurements for even the same satellite. Station 10 performs various processes (discussed below) to normalize time bases 20 and 22.

Receivers 16 and 18 each couple to a controller 24 through their own data communication links, such as RS-232 serial links. Controller 24 may be implemented using a conventional personal computer, general purpose computer, workstation, or the like. Controller 24 includes input/output (I/O) devices 26, which may include a keyboard, mouse, display, printer, and the like. In addition, controller 24 includes memory 28. Memory 28 may include semiconductor, magnetic, and/or optical memory components. Memory 28 is used to store software programming which defines processes performed by controller 24 and station 10, to store variables, tables, lists, databases, and other memory data structures which are maintained and otherwise used by these processes, and to log differential GPS correction data which may be used to accurately resolve locations using conventional differential GPS location resolution processes.

Controller 24 may optionally couple to a public switched telecommunications network (PSTN) 30 so that differential GPS correction data may be communicated therethrough. In addition, controller 24 may optionally couple to a radio 32 so that differential GPS correction data may be transmitted in real time.

Figure 2:
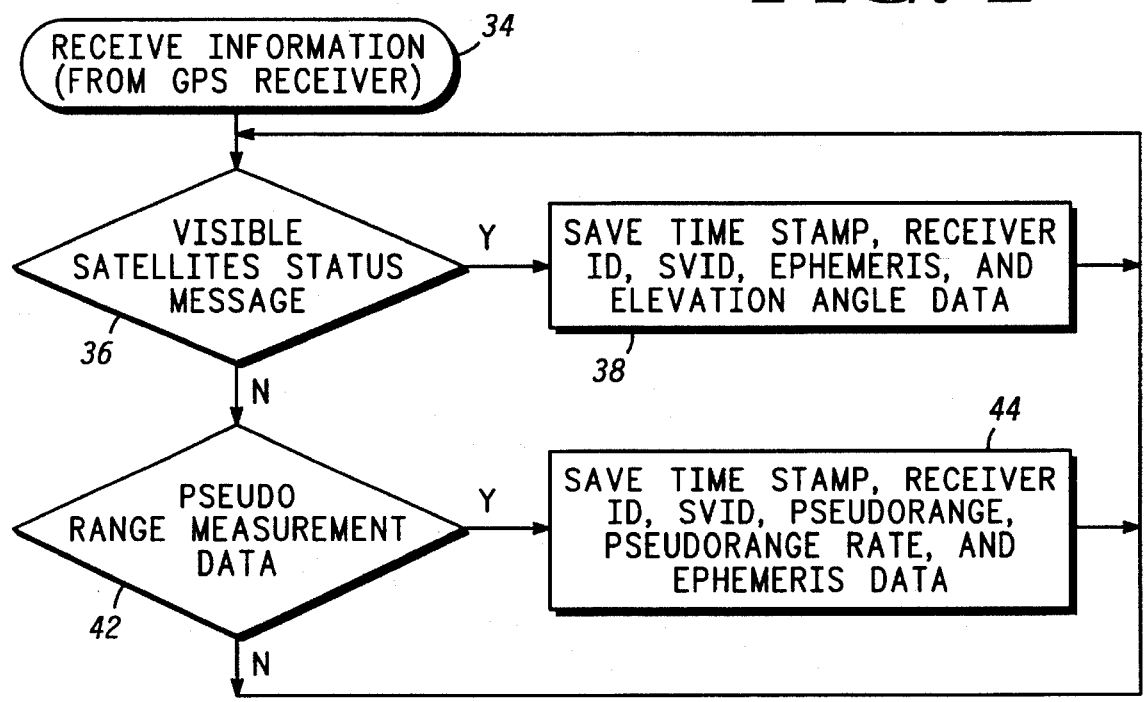
FIG. 2 shows a flow chart of a receive information process performed by the master control station.

FIG. 2 shows a flow chart of a receive information process 34 performed by master control station 10. Process 34 is performed to collect information from GPS receivers 16 and 18 (see FIG. 1). In particular, process 34 performs a query task 36 to determine if a visible satellite status message has been received at controller 24 (see FIG. 1).

Figures 3, 4, 7:
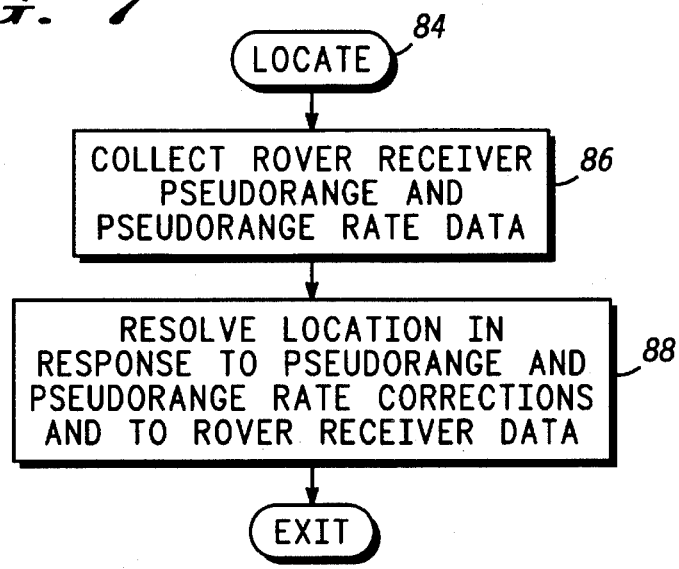
FIG. 3 shows a data format diagram of an exemplary inview table maintained in a memory of the master control station.
FIG. 4 shows a data format diagram of an exemplary location data table maintained in the memory of the master control station.
FIG. 7 shows a flow chart of a locate process performed by the master control station.

The visible satellites status message is a data communication from a receiver 16 or 18 that conveys the identities of all satellites (SVIDs) whose transmission signals can currently be received by the receiver. This data communication identifies all satellites that the receiver may be currently tracking and for which the receiver may be determining pseudorange and pseudorange rate measurements along with other satellites that the receiver may not be currently tracking. When a visible satellites status message is detected, a task 38 saves and associates together a time stamp along with a receiver ID, which identifies the receiver 16 or 18 sending the message, and the SVIDs. In addition, for each satellite the message conveys ephemeris data and elevation angle data, and task 38 saves this data as well. FIG. 3 shows a data format diagram of an exemplary in-view table 40 that controller 24 may maintain in its memory 28 (see FIG. 1) to store this information. While the receivers 16 and 18 used in the preferred embodiment happen to automatically supply elevation angles, those skilled in the art could also devise algorithms to calculate the elevation angles using the satellite ephemeris data and the known location of station 10. After task 38, program control loops back to the top of process 34.

When query task 36 determines that information received at controller 24 is not a visible satellites status message, a query task 42 determines whether the information is pseudorange measurement data from either of receivers 16 or 18. If pseudorange measurement data are received, a task 44 is performed to save and associate a time stamp with the receiver ID, SVID, pseudorange (PR) measurement, pseudorange rate (PRR) measurement, and ephemeris data. FIG. 4 shows a data format diagram of an exemplary pseudorange data table 46 that controller 24 may maintain in its memory 28 (see FIG. 1) to store this information. After task 44, program control loops back to the top of process 34.

When query task 42 determines that information received at controller 24 is not pseudorange measurement data, any number of additional tasks may be performed to support the receiving of information at controller 24. For example, controller 24 may send commands to receivers 16 and 18 which instructs them to respond with the above-discussed visible satellites status message. Or, controller 24 may send other messages to receivers 16 and/or 18 and receive still other messages therefrom. Eventually, program control loops back to the top of process 34.

Figure 5:
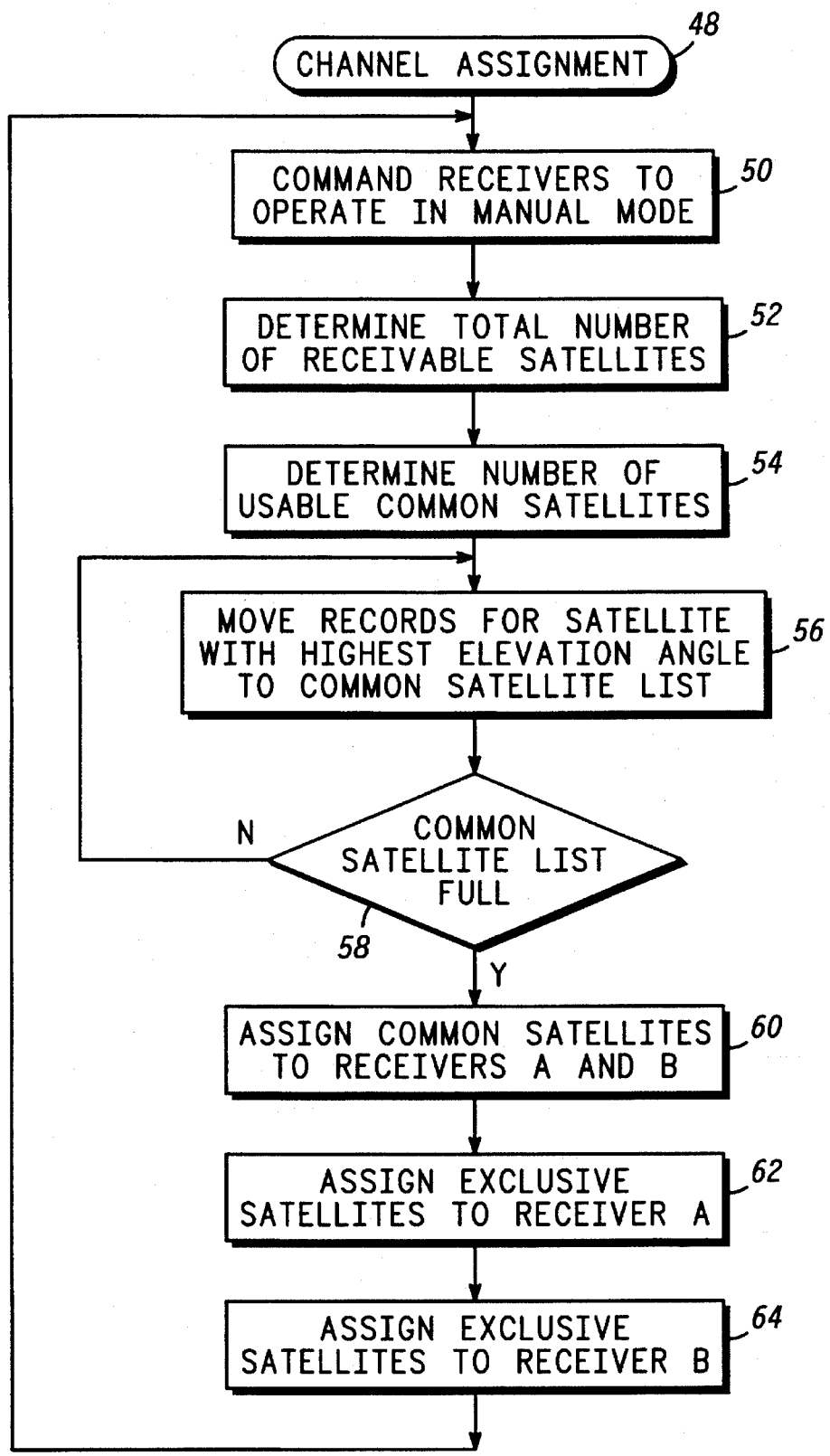
FIG. 5 shows a flow chart of a channel assignment process performed by the master control station.
Figure 7:
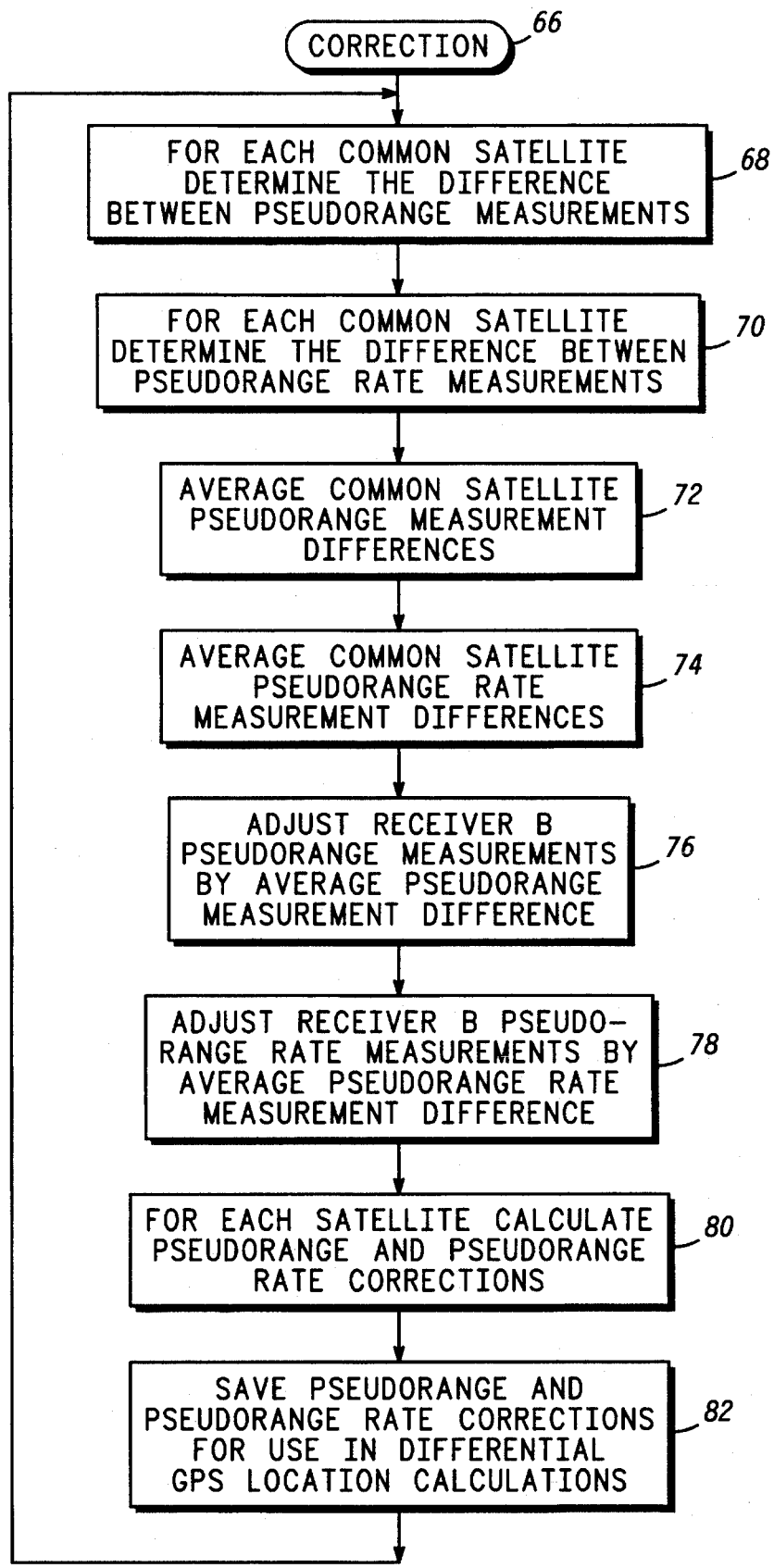

FIG. 5 shows a flow chart of a channel assignment process 48 performed by controller 24 of master control station 10. Generally, process 48 selects which ones of the receivable satellites are to be tracked exclusively by receiver 16, exclusively by receiver 18, and by both receivers 16 and 18. Process 48 may operate in a background mode simultaneously with receive information process 34 (see FIG. 2).

Process 48 performs a task 50 to command receivers 16 and 18 to operate in a manual mode. In the manual mode, receivers 16 and 18 track the satellites specified externally rather than the satellites that their own internal processes may decide to track. While FIG. 5 depicts process 48 as being performed in a loop that often repeats task 50, those skilled in the art will appreciate that in alternative embodiments task 50 need not be repeated so often.

After task 50, a task 52 determines the total number of receivable satellites available at the moment. This determination may be accomplished by evaluating in-view table 40 (see FIG. 3). Table 40 may show that most receivable satellites can be received at both of receivers 16 and 18. However, task 52 simply identifies the total number of unique satellites which may be received.

Next, a task 54 determines the number of usable common satellites. A common satellite is defined as being a single satellite that will be assigned to a unique channel in receiver 16 and another channel in receiver 18. For this reason, the satellite is "common" to both receivers 16 and 18. Task 54 may make its determination by subtracting the total number of receivable satellites from the sum total of all channels available between receivers 16 and 18. For example, if ten satellites are receivable and six channels are available in each of receivers 16 and 18 for a total of twelve, then two common channels are usable.

After task 54, a task 56 moves all records for the satellite with the highest elevation angle from in-view table 40 (see FIG. 3) to a common satellite list (not shown). After task 56, a query task 58 determines whether the common satellite list is full. The common satellite list is full when it includes the number of common satellites determined above in task 54. So long as the common satellite list is not yet full, program control loops back to task 56 to select the satellite with the next highest elevation angle. Program control remains in the loop that includes tasks 56 and 58 until the common satellite list is full.

Thus, tasks 56 and 58 together identify the one or lo more common satellites that will be assigned to both of receivers 16 and 18. The satellites which are selected to be common satellites correspond to satellites having the highest elevation angles. Signals received at station 10 (see FIG. 1) from such satellites will tend to have higher signal-to-noise ratios, which tend to yield less error in normalizing time base 22 to time base 20 (see FIG. 1).

When the common satellite list is full, a task 60 assigns the common satellites to the A and B receivers 16 and 18, respectively. The assignment is made by sending appropriate data messages to receivers 16 and 18. Next a task 62 evaluates the remaining entries from in-view table 40 (see FIG. 3) and assigns corresponding satellites to the A receiver 16. Tasks 60 and 62 desirably cause all of the channels in receiver 16 to receive an assignment. After task 62, a task 64 assigns the remaining entries from in-view table 40 (see FIG. 3) to channels in the B receiver 18. Desirably, tasks 60 and 64 cause all of the channels in receiver 18 to receive an assignment. After task 64, program control may perform any number of additional tasks which are not related to the present invention. Such tasks may include waiting until a proper time occurs to reassign satellites to channels. Eventually, program control returns to task 50.

In an example where the A and B receivers 16 and 18, respectively, each have six channels and ten satellites are currently in view, channel assignment process 48 will yield an allocation where two satellites are assigned to both receivers A and B. Four satellites are exclusively assigned to channels in the A receiver, and four satellites are exclusively assigned to channels in the B receiver.

The A and B receivers 16 and 18 each generate pseudorange measurements and pseudorange rate measurements for the satellites assigned thereto. These measurements are collected and saved in task 44 (see FIG. 2). Each pseudorange measurement contains two components, namely the true range and a clock bias which is unique to the receiver generating the measurement. Likewise, each pseudorange rate measurement represents the true range rate plus a clock bias rate which is unique to the receiver generating the measurement. For the common satellites, the differences between the pseudorange and pseudorange rate measurements are attributable to differences between time bases 20 and 22 (see FIG. 1).

FIG. 6 shows a flow chart of a correction process 66 performed by controller 24 of master control station 10. Generally, process 66 processes non-normalized pseudorange data received from receivers 16 and 18 into normalized pseudorange data and then processes the normalized pseudorange data into differential GPS correction data. Process 66 may operate in a background mode simultaneously with receive information process 34 (see FIG. 2).

In a task 68, process 66 identifies the common satellites between the A and B receivers 16 and 18 and determines the difference between pseudorange measurements for these satellites The pseudorange measurements may be obtained from the pseudorange data table 46 (see FIG. 4). In addition, task 68 may verify that time stamps for the measurements correspond. For the common satellites, task 68 determines the difference between the pseudorange measurements. Each difference represents an alternate characterization of the differences between time bases 20 and 22 (see FIG. 1).

Next, a task 70 determines the difference between pseudorange rate measurements for the common satellites. The pseudorange rate measurements may be obtained from pseudorange data table 46 (see FIG. 4), and task 70 may verify that time stamps for the measurements correspond. The differences determined in task 70 correspond to alternate characterizations of the difference between clock bias rates.

After task 70, a task 72 averages the clock bias measurements, and a task 74 averages the common clock rate bias measurements. The averaging of the various characterizations of the common satellite pseudorange difference measurements and common satellite pseudorange rate difference measurements reduces the error in accurately predicting the differences between time bases. Those skilled in the art will appreciate that the averaging performed in tasks 72 and 74 need not be any specific mathematical operation. Rather, the averaging performed in tasks 72 and 74 simply combines multiple measurements to form a single measurement which is representative of the multiple measurements. In certain situations only a single common channel may be assigned. In such situations, the result of tasks 72 and 74 will simply be the pseudorange measurement difference and pseudorange rate measurement difference for that single common satellite.

After task 74, a task 76 adjusts the B receiver 18 pseudorange measurements by the average pseudorange measurement difference determined above in task 72. The adjustment may be performed by adding or subtracting the average, as appropriate, to all B receiver pseudorange measurements to normalize these measurements to the pseudorange measurements for the A receiver. Likewise, a task 78 adjusts the B receiver 18 pseudorange rate measurements by the average pseudorange rate measurement difference determined above in task 74. The adjustment may be performed by adding or subtracting the average, as appropriate, to all B receiver pseudorange rate measurements to normalize these measurements to the pseudorange rate measurements for the A receiver.

After task 78, a task 80 calculates pseudorange and pseudorange rate corrections for each satellite monitored by station 10, whether through the A receiver 16 or the B receiver 18. Task 80 uses the ephemeris data for the satellites and the known location for master control station 10 to determine expected pseudorange and pseudorange rate data. In addition, task 80 utilizes the pseudorange and pseudorange rate measurements from the A receiver 16 and the adjusted pseudorange and adjusted pseudorange rate measurements from the B receiver 18. The adjusted pseudorange and pseudorange rate measurements were generated in tasks 76 and 78. These measured pseudorange and pseudorange rate data are subtracted from corresponding items of the expected data to generate differential GPS correction data.

The use of a single antenna 12 (see FIG. 1) for both the A and B receivers 16 and 18 is preferred. The single common antenna allows task 80 to omit calculations which would otherwise be needed to compensate for different GPS receivers determining pseudorange and pseudorange rate measurements from different locations.

After task 80, a task 82 saves the pseudorange and pseudorange rate corrections calculated above in task 80 in memory 28 (see FIG. 1). These differential GPS correction data are saved in association with SVID and time stamp data. These differential GPS correction data may be used later in differential GPS location calculations. After task 82, correction process 66 may perform any number of additional tasks which relate to the differential GPS. Such additional tasks may, for example, include the transmission of messages conveying real time differential GPS correction data through radio 32 (see FIG. 1). Eventually, program control returns to task 68 to perform the correction process again on fresh location data.

FIG. 7 shows a flow chart of a locate process 84 performed by controller 24 of master control station 10. Locate process 84 may be performed to resolve locations suggested by data remotely collected in roving GPS receivers. Such data may be received at master control station 10 through PSTN 30 (see FIG. 1) or other means. Locate process 84 performs a task 86 to collect the pseudorange and pseudorange rate data gathered by a roving GPS receiver. Such data generally include the items listed in pseudorange data table 46 (see FIG. 4).

After task 86, a task 88 resolves the location indicated by the roving receiver data in response to the pseudorange and pseudorange rate corrections saved above in task 82 (see FIG. 6). Task 88 performs a conventional GPS location determination process, the nature of which is well known. The maximum accuracy achieved depends upon the amount of data available for resolving the location. After task 88, program control exits process 84. While process 84 may be performed in master control station 10, it is not restricted to being performed there. In alternate embodiments, process 84 may be performed in roving GPS receivers or at other locations.

In summary, the present invention provides an improved master control station for use in connection with differential GPS location determination. The present invention also provides a low cost method for accurately determining locations. A master control station utilizes two GPS receivers which are actually intended to function as roving GPS receivers. Since such GPS receivers are adapted to mass market demands, they are highly reliable and inexpensive. The present invention normalizes time base offsets between the two GPS receivers to provide a master control station that monitors more satellites than either GPS receiver monitors alone. The monitoring of many satellites is achieved through software processes running on a controller. This software solution is desirable because it takes advantage of mass market, off-the-shelf hardware which is used for mass market roving GPS receivers and personal computers.

The present invention has been described above with reference to preferred embodiments. However, those skilled in the art will recognize that changes and modifications may be made in these preferred embodiments without departing from the scope of the present invention. For example, alternate master control stations could employ more than two GPS receivers. These and other changes and modifications which are obvious to those skilled in the art are intended to be included within the scope of the present invention.

What is claimed is:

1. A differential global positioning system (GPS) location determination method comprising the steps of:

a) generating pseudorange measurements for each of N channels, where N is an integer number greater than one, in a first GPS receiver which operates upon a first receiver time base;

b) generating pseudorange measurements for each of M channels, where M is an integer number greater than one, in a second GPS receiver which operates upon a second receiver time base;

c) identifying a common satellite of said first receiver and said second receiver; and d) determining a difference between said first and second receiver time bases in response to pseudorange measurements generated by said first and second GPS receivers for said common satellite.

2. A method as claimed in claim 1 additionally comprising the step of adjusting pseudorange measurements generated by one of said first and second GPS receivers in response to said difference determined in said determining step.

3. A method as claimed in claim 2 wherein:

said adjusting step generates adjusted pseudorange measurements; and said method additionally comprises the step of resolving a location in response to said adjusted pseudorange measurements.

4. A method as claimed in claim 1 wherein:

said step a) additionally generates pseudorange rate measurements for said N channels;

said step b) additionally generates pseudorange rate measurements for said M channels; and said step d) additionally determines a difference between said pseudorange rate measurements generated by said first and second GPS receivers for said common satellite.

5. A method as claimed in claim 1 wherein said step c) identifies first and second common satellites to said N channels and said M channels, and said step d) comprises the steps of:

determining time base differences associated with said first and second common satellites; and averaging said time base differences determined for said first and second common satellites.

6. A method as claimed in claim 1 additionally comprising the steps of:

assigning said N channels to said first GPS receiver; and assigning said M channels to said second GPS receiver.

7. A method as claimed in claim 6 additionally comprising, prior to said assigning steps, the steps of:
   identifying receivable satellites at said first and second GPS receivers; and
   selecting one of said receivable satellites to serve as said common satellite.

8. A method as claimed in claim 7 wherein said selecting step selects said common satellite to correspond to a receivable satellite having a highest elevation angle.

9. A method as claimed in claim 6 additionally comprising, prior to said assigning steps, the steps of:
   identifying satellites receivable at said first and second GPS receivers; and
   selecting a plurality of said receivable satellites identified by said identifying step to serve as said common satellite, said plurality of said receivable channels including said common channel.

10. A method as claimed in claim 1 additionally comprising the step of configuring said first and second GPS receivers to process signals received at a common antenna.

11. A differential global positioning system (GPS) location determination method comprising the steps of:
   a) generating pseudorange and pseudorange rate measurements for each of N channels, where N is an integer number greater than one, in a first GPS receiver which operates upon a first time base;
   b) generating pseudorange and pseudorange rate measurements for each of M channels, where M is an integer number greater than one, in a second GPS receiver which operates upon a second time base;
   c) identifying a common satellite of said first GPS receiver and said second GPS receiver;
   d) determining pseudorange differences between said pseudorange measurements and pseudorange rate differences between said pseudorange rate measurements for said common satellite; and
   e) adjusting said pseudorange measurements and said pseudorange rate measurements generated by one of said first and second GPS receivers in response to said pseudorange differences and said pseudorange rate differences, respectively, determined in said step d).

12. A method as claimed in claim 11 wherein:
   said step e) generates adjusted pseudorange measurements and adjusted pseudorange rate measurements; and
   said method additionally comprises the step of resolving a location in response to said adjusted pseudorange measurements and pseudorange rate measurements.

13. A method as claimed in claim 11 wherein said step c) identifies first and second common satellites to said N channels and said M channels, and said step d) comprises the steps of:

determining common satellite pseudorange measurement differences and common satellite pseudorange rate measurement differences associated with said first and second common channels; and
averaging said common satellite pseudorange differences and said common satellite pseudorange rate differences determined for said first and second common satellites.

14. A method as claimed in claim 11 additionally comprising the steps of:
   assigning said N channels to said first GPS receiver; and
   assigning said M channels to said second GPS receiver.

15. A method as claimed in claim 14 additionally comprising, prior to said assigning steps, the steps of:
   identifying receivable satellites at said first and second GPS receivers; and
   selecting one of said receivable satellites to serve as said common satellite.

16. A method as claimed in claim 11 additionally comprising the step of configuring said first and second GPS receivers to process signals received at a common antenna.

17. A differential global positioning system (GPS) master control station comprising:
   a first GPS receiver operable upon a first time base and configured to receive N satellites, where N is an integer number greater than one;
   a second GPS receiver operable upon a second time base and configured to receive M satellites, where M is an integer number greater than one; and
   a controller, coupled to said first and second GPS receivers, for identifying a common satellite of said N satellites and said M satellites and for determining a difference between said first and second time bases in response to information received at said first and second GPS receivers for said common satellite.

18. A master control station as claimed in claim 17 additionally comprising an antenna coupled to said first receiver and to said second receiver.

19. A master control station as claimed in claim 17 wherein:
   said first receiver is configured to generate pseudorange measurements and pseudorange rate measurements for each of said N channels;
   said second receiver is configured to generate pseudorange measurements and pseudorange rate measurements for each of said M channels; and
   said controller is configured to determine a difference between said pseudorange measurements generated by said first and second receivers for said common satellite and to determine a difference between said pseudorange rate measurements generated by said first and second receivers for said common satellite.

* * * * *